US011230057B2

(12) United States Patent
Chen et al.

(10) Patent No.: US 11,230,057 B2
(45) Date of Patent: Jan. 25, 2022

(54) 3D PRINTING WITH VARIABLE VOXEL SIZES

(71) Applicant: University of Southern California, Los Angeles, CA (US)

(72) Inventors: Yong Chen, Los Angeles, CA (US); Yuanrui Li, Los Angeles, CA (US); Huachao Mao, Los Angeles, CA (US); Wei Wu, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 525 days.

(21) Appl. No.: 15/993,197

(22) Filed: May 30, 2018

(65) Prior Publication Data
US 2018/0345580 A1   Dec. 6, 2018

Related U.S. Application Data

(60) Provisional application No. 62/513,643, filed on Jun. 1, 2017.

(51) Int. Cl.
| | |
|---|---|
| *B29C 64/268* | (2017.01) |
| *B29C 64/393* | (2017.01) |
| *B29C 64/277* | (2017.01) |
| *B29C 64/245* | (2017.01) |
| *B29C 67/04* | (2017.01) |
| *B33Y 10/00* | (2015.01) |
| *B33Y 30/00* | (2015.01) |
| *B23K 26/067* | (2006.01) |

(Continued)

(52) U.S. Cl.
CPC .......... *B29C 64/268* (2017.08); *B23K 26/067* (2013.01); *B29C 64/129* (2017.08); *B29C 64/245* (2017.08); *B29C 64/277* (2017.08); *B29C 64/286* (2017.08); *B29C 64/393* (2017.08); *B29C 67/04* (2013.01); *B33Y 10/00* (2014.12); *B33Y 30/00* (2014.12); *B33Y 50/02* (2014.12)

(58) Field of Classification Search
CPC ... B29C 64/268; B29C 64/393; B29C 64/277; B29C 67/04; B29C 64/245; B23K 26/067
USPC ........... 219/121.69, 121.71, 121.72, 121.75; 425/149, 174.4, 375
See application file for complete search history.

(56) References Cited

U.S. PATENT DOCUMENTS

| | | | | |
|---|---|---|---|---|
| 6,245,249 B1 * | 6/2001 | Yamada | ................. | B33Y 30/00 216/33 |
| 6,833,234 B1 * | 12/2004 | Bloomstein | ............. | B29C 64/40 264/401 |

(Continued)

*Primary Examiner* — Thien S Tran
(74) *Attorney, Agent, or Firm* — Snell & Wilmer LLP

(57) ABSTRACT

Methods, systems, and apparatus for multi-scale stereolithography. The apparatus includes a light source for providing a laser beam having a first shape and a first size. The apparatus includes a dynamic aperture having multiple apertures that are of the same or different sizes or shapes. The dynamic aperture is configured to receive the laser beam and modify at least one of the shape or the size of the laser beam. The apparatus includes a platform for holding an object to be printed. The apparatus includes a processor connected to at least one of the light source, the dynamic aperture or the platform. The processor is configured to move the platform to direct the laser beam or direct the laser beam to cure resin onto the object to be printed using a first aperture of the multiple apertures to form the object.

20 Claims, 9 Drawing Sheets

(51) Int. Cl.
  *B29C 64/286* (2017.01)
  *B29C 64/129* (2017.01)
  *B33Y 50/02* (2015.01)

(56) References Cited

U.S. PATENT DOCUMENTS

| | | | |
|---|---|---|---|
| 2005/0208168 A1* | 9/2005 | Hickerson | B29C 64/245 425/174.4 |
| 2010/0089885 A1* | 4/2010 | Sercel | B23K 26/067 219/121.72 |
| 2014/0272329 A1* | 9/2014 | McCollum | B23K 26/361 428/195.1 |

* cited by examiner

TABLE 2: COMPARISON BETWEEN DIFFERENT SL PROCESSES

| METRIC | LSL | PuSL | TPP | CLIP | LaPuSL | Ours |
|---|---|---|---|---|---|---|
| PART SIZE (mm) | 125 | 3 | 0.2 | 141 | 80 | 40 |
| FEATURE SIZE (um) | 155 | 3 | 0.1 | 75 | 5 | 30 |
| RATIO | 800 | 1000 | 2000 | 1900 | 16000 | 1333 |
| LAYER THICKNESS (um) | 25 | 5 | - | 1 | 5 | 20 |
| SPEED /1cm$^3$ | 6 hr | 300 hr | 3000 hr | 6 min | 6 hr | 3 hr |
| COST | $$ | $$$ | $$$$ | $$$$ | $$$$ | $ |

FIG. 8

3D PRINTING WITH VARIABLE VOXEL SIZES

CROSS-REFERENCE TO RELATED APPLICATIONS

This application claims priority to and the benefit of U.S. Provisional Patent Application No. 62/513,643 titled "3D PRINTING WITH VARIABLE VOXEL SIZES BASED ON APERTURE PLATE," filed on Jun. 1, 2017, and the entirety of which is hereby incorporated by reference herein.

BACKGROUND

Field

This specification relates to a system, method or apparatus for multi-scale three-dimensional (3D) printing.

Description of the Related Art

Current stereolithography (SL) fabricates three-dimensional (3D) objects in a single scale level, e.g., printing macro-scale or micro-scale objects. However, it is difficult for SL printers to fabricate a 3D macro-scale object with micro-scale features. When fabricating using SL, there are various tradeoffs between part size, resolution and speed.

For example, there is a tradeoff between fabrication resolution and fabrication speed. An SL printer that has a high resolution requires a longer period of time to print or fabricate the feature or object. An SL printer that has a low resolution, however, sacrifices resolution to fabricate or print the object faster. In another example, there is a tradeoff between scalability and fabrication speed. As the size of the object to be printed increases, an SL printer requires more time to print the object, and thus, the speed of printing the object decreases. An SL printer that fabricates micro-scale features requires a significant amount of time to build objects of large sizes. In another example, there is a tradeoff between feature resolution and part size. An SL printer that has a large part size has difficulty in fabricating highly detailed features.

Accordingly, there is a need for a multi-scale SL apparatus or process that optimizes the laser beam to fabricate features at different scales.

SUMMARY

In general, one aspect of the subject matter described in this specification may be embodied in a multi-scale stereolithography (SL) apparatus. The apparatus includes a light source for providing a laser beam having a first shape and a first size. The apparatus includes a dynamic aperture having multiple apertures that are of different sizes or shapes. The dynamic aperture is configured to receive the laser beam and modify at least one of the shape or the size of the laser beam. The apparatus includes a platform for holding an object to be printed. The apparatus includes a processor connected to at least one of the light source, the dynamic aperture or the platform. The processor is configured to move the platform and to direct the laser beam to cure resin onto the object to be printed using a first aperture of the multiple apertures to form the object.

These and other embodiments may optionally include one or more of the following features. The apparatus may include a linear or rotation stage for positioning the dynamic aperture. The apparatus may be in a first position. The processor may be connected to the linear or rotation stage. The processor may be configured to move the linear or rotation stage to a second position from the first position to position a second aperture of the multiple apertures in a path of the laser beam to modify the shape or the size of the laser beam to a second shape or a second size.

The cured resin may be of a second shape or a second size. The cured resin onto the printed object may be of a second shape or a second size. The cured resin may be of a first thickness when the first aperture is used and may be of a second thickness when a second aperture is used.

The multiple apertures may include a first aperture of a first size, a second aperture of a second size and a third aperture of a third size. The processor may be configured to determine a first offset based on the first size, a second offset based on the second size and a third offset based on the third size. The processor may be configured to slice the object to be printed into multiple layers. Each layer may have the same or a different thickness. The processor may be configured to generate one or more toolpaths to form the object to be printed based on the first offset, the second offset, the third offset and the thickness of each layer. The thickness of a first layer may be different than a thickness of a second layer. The multiple apertures may include a first aperture that allows a small-scale light source to pass through and a second aperture that allows a large-scale light source to pass through. The multiple apertures may include a first aperture having a first shape and a second aperture having a second shape. The first shape may be different from the second shape.

In another aspect, the subject matter may be embodied in a method of providing differing light beams in a multi-scale stereolithography (SL) apparatus. The method includes providing, using a light source, an original light beam having a beam dimension. The method includes adjusting, using a processor, a dynamic aperture to a first aperture. The method includes projecting, using the light source, the original light beam through the first aperture to form a second light beam with a small-scale beam dimension and onto a resin. The method includes adjusting, using the processor, the dynamic aperture to a second aperture. The method includes projecting, using the light source, the original light beam through the second aperture to form a third light beam with a large-scale beam dimension and onto the resin.

In another aspect, the subject matter may be embodied in a multi-scale stereolithography apparatus. The apparatus includes a light source for providing a laser beam having a size. The apparatus includes a platform for holding an object to be printed. The apparatus includes a dynamic aperture having multiple apertures that are of different sizes. The dynamic aperture is configured to receive the laser beam and to modify the size of the laser beam. The apparatus includes a linear stage (or a rotation stage) connected to the dynamic aperture and configured to move the dynamic aperture among the multiple apertures. The apparatus includes a processor connected to at least one of the light source, the dynamic aperture or the linear or rotation stage. The processor is configured to move the linear or rotation stage to a first position to position a first aperture of the multiple apertures into a path of the laser beam and move the platform or direct the laser beam to cure resin onto the object to be printed.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 8 is a table that compares different SL processes and/or apparatuses over different metrics according to an aspect of the invention.

DETAILED DESCRIPTION

Disclosed herein are systems, apparatuses, devices and/or methods for a multi-scale stereolithography (SL) apparatus ("multi-scale SL apparatus") that optimizes the three-dimensional fabrication of a part or an object. Particular embodiments of the subject matter described in this specification may be implemented to realize one or more of the following advantages. The multi-scale SL apparatus has multiple apertures of the same or differing shapes and/or sizes. The multi-scale SL apparatus directs a light source, such as a laser, through at least one of the multiple apertures of the same or differing shapes and/or sizes to optimize both the resolution and the speed. For example, the multi-scale SL apparatus may use a high-resolution laser beam to form micro-features to provide higher resolution and/or fidelity on a part or an object and may use a lower resolution laser beam to form macro-features to increase the speed at which the part or the object is fabricated or printed. This optimizes both the resolution and the speed in the XY planar direction.

Other benefits and advantages of the multi-scale SL apparatus include the capability to optimize the resolution and the speed in the Z direction. The multi-scale SL apparatus slices different portion of the part into layers with the same or different thicknesses and fabricates the different layers using laser beams with different dimensions. This optimizes the resolution and the speed in the Z direction. Additionally, the multi-scale SL apparatus may use different shapes to achieve different levels of the resolution and/or the speed when forming features on the part.

Figure 1:
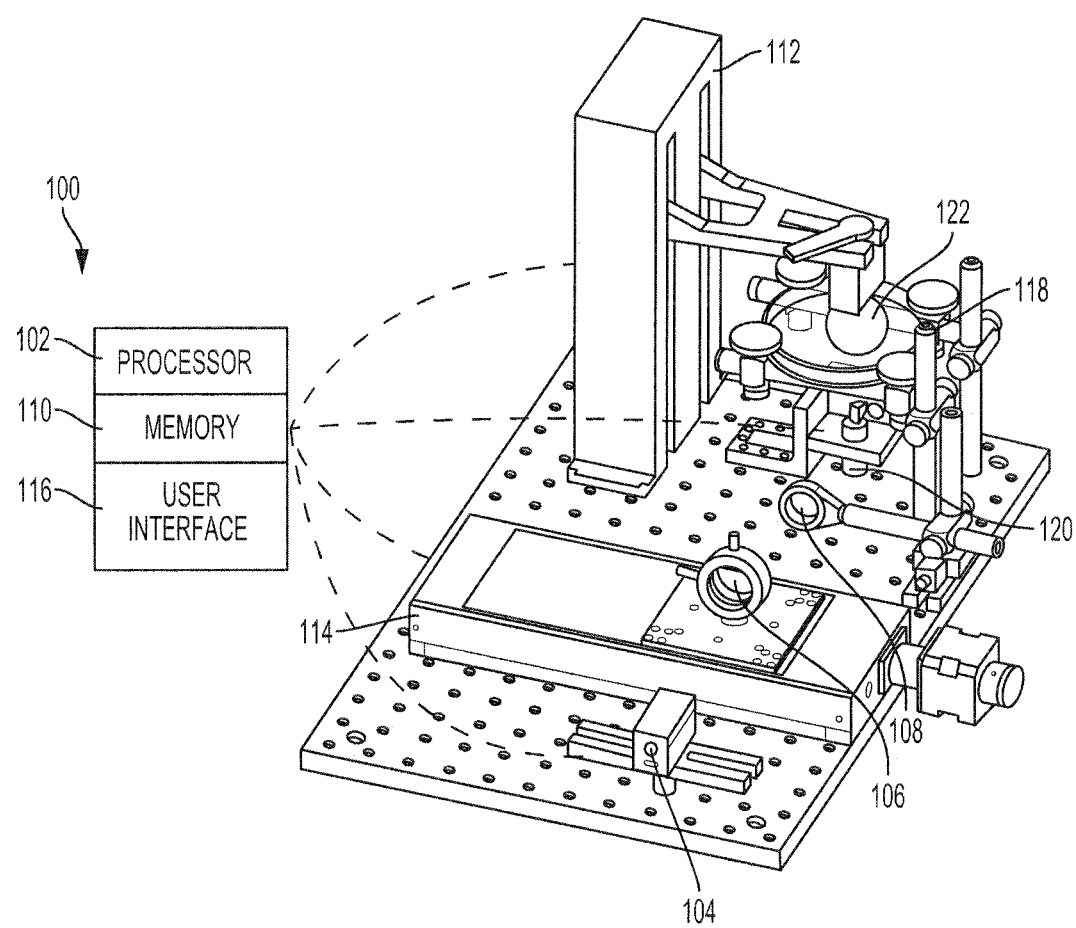
FIG. 1 shows an example multi-scale stereolithography (SL) apparatus according to an aspect of the invention.

FIG. 1 shows a multi-scale SL apparatus 100. The multi-scale SL apparatus 100 forms laser beams of different dimensions to form micro-features and/or macro-features to optimize the resolution and the speed of the fabrication process. Conventional approaches use a single scale in size to print or fabricate features on a part or an object. Whereas, the multi-scale SL apparatus 100 has a dynamic aperture with multiple apertures having the same or different pinholes that control or modify the shape, e.g., pattern, and/or the resolution, i.e., size, of the laser beam to control the shape and/or the size of the cured portion onto the part or the object (hereinafter referred to as "part"). The multi-scale SL apparatus 100 may control the resolution and the speed of the fabrication process by switching between different apertures with different pinholes having different sizes and/or shapes. The multi-scale SL apparatus 100 optimizes the printing or the fabrication of the features on the part for both the resolution and the speed.

Figure 2:
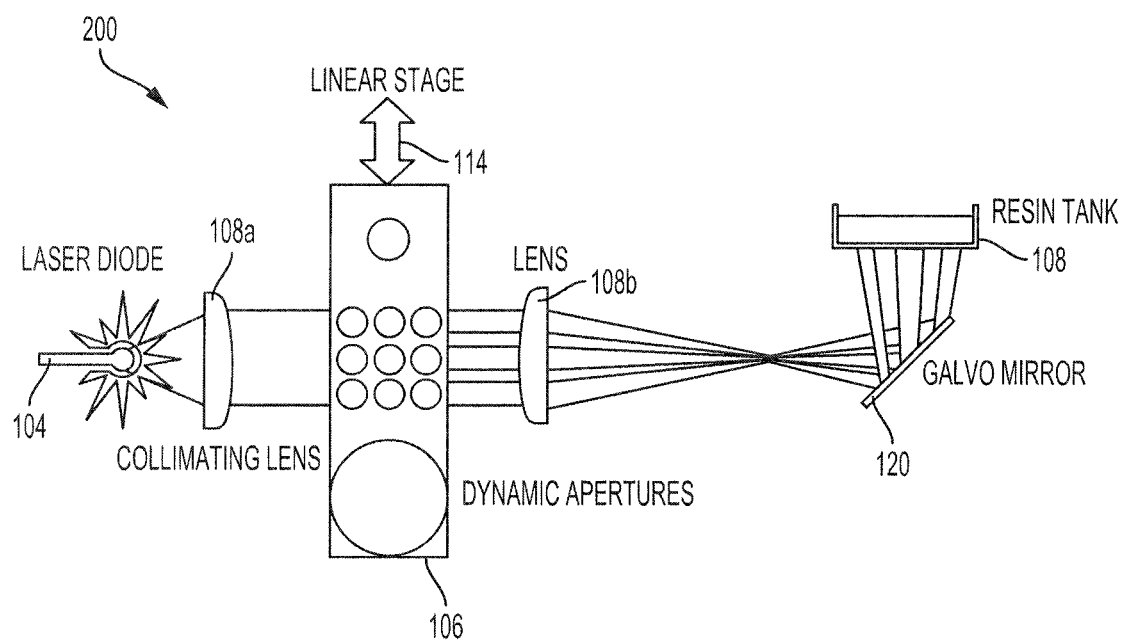
FIG. 2 shows a beam optics device of the multi-scale SL apparatus of FIG. 1 according to an aspect of the invention.

The multi-scale SL apparatus 100 includes a processor 102, a light source 104, a dynamic aperture 106, one or more lenses 108, a memory 110 and/or a platform 112. The multi-scale SL apparatus 100 may include a linear or rotation stage 114, a user interface 116, a resin tank 118 and/or one or more mirrors 120. The light source 104, the dynamic aperture 106, the one or more lenses 108, and the one or more mirrors 120 may form a beam optics device 200, as shown in FIG. 2, for example.

The multi-scale SL apparatus 100 includes a processor 102. The processor 102 may include one or more data processing apparatuses, such as a controller or a computer. The processor 102 may access the memory 110 to perform programmed instructions stored on the memory 110, move the platform 112, adjust the dynamic aperture 106 or perform other functions to cure the resin to print or fabricate the part 122 or features on the part 122. For example, the processor 102 may move a linear or rotation stage 114 to position one of the pinholes of an aperture of the dynamic aperture 106 into the path of the laser beam outputted from the light source 104. The laser beam passes through the dynamic aperture 106 and cures the resin to form a feature on the part 122.

A memory 110 may be coupled to the processor 102. The memory 110 may be local or remote. The memory 110 may store instructions to execute on the processor 102 and may include a computer-readable medium, such as one or more of a RAM or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the processor 102. The memory 110 may store, for example, a computer-aided design (CAD) drawing or model. The CAD drawing or model may be a precision model that provides instructions to generate a toolpath for the printing or the fabrication of a part.

The multi-scale SL apparatus includes a user interface 116. The user interface 116 may be a display or a personal device, e.g., a mobile phone, a tablet, a personal computer, that is connected to the processor 102. The user interface 116 may include any device capable of receiving user input, such as a button, a dial, a microphone, or a touch screen, and any device capable of output, such as a display, a speaker, or a refreshable braille display. The user interface 116 allows a user to interact with the processor 102.

The multi-scale SL apparatus 100 includes a light source 104. The light source 104 may be a laser diode or other laser. The light source 104 outputs a laser beam. The laser beam may have a dimension. The dimension may include a shape and/or a size. The processor 102 may be connected to the light source 104 to operate the light source 104, such as to turn the light source 104 on or off. The processor 102 may intermittently turn the light source 104 on or off.

The multi-scale SL apparatus 100 includes a dynamic aperture 106. The dynamic aperture 106 may have multiple apertures. The different apertures each have different sized and/or shaped pinhole. In some embodiments, the different apertures may have the same sized and/or shaped pinholes.

For example, the dynamic aperture 106 may have an aperture with a small-scale pinhole that forms a light beam into a light beam with a small-scale dimension, an aperture with a medium-scale pinhole that forms the light beam into a light beam with a medium-scale dimension, and an aperture with a large-scale pinhole that forms the light beam into a light beam with a large-scale dimension. The small-scale dimension may be smaller in size than the medium-scale dimension and smaller in size than the large-scale dimension. The medium-scale dimension may be larger in size than the small-scale dimension and smaller in size than the large-scale dimension. The large-scale dimension may be larger in size than the small-scale dimension and larger in size than the medium-scale dimension.

Figure 3:
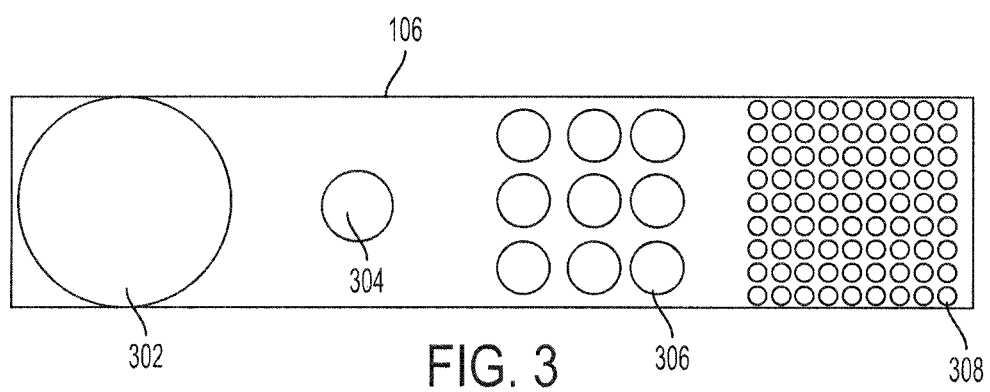
FIG. 3 shows different apertures with different sized and/or shaped pinholes for the apertures of the dynamic aperture according to an aspect of the invention.
Figure 4:
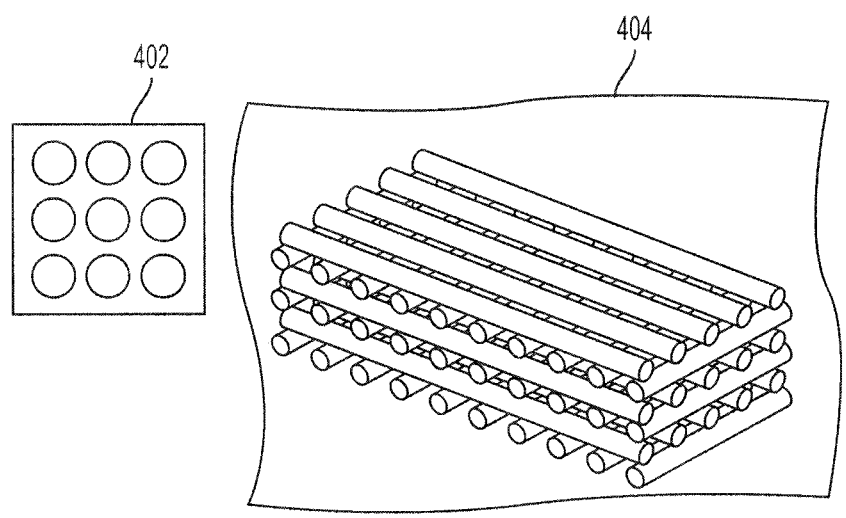
FIG. 4 shows an example of an aperture with a pillar shape and the corresponding pillar-shaped part formed by the multi-scale SL apparatus of FIG. 1 using the pillar-shaped aperture according to an aspect of the invention.

In another example, the dynamic aperture 106 may have apertures with a large-scale pinhole 302, a small-scale pinhole 304, a matrix of pinholes in a pattern 306 or a densely populated matrix of pinholes in a pattern 308, as shown in FIG. 3, for example. FIG. 3 shows different patterns for the pinholes of the different apertures of the dynamic aperture 106. The differently shaped pinholes may be useful in fabricating a functional surface with different micro patterns of pillars, as shown in FIG. 4, for example.

In order to adjust the dynamic aperture 106 to use different apertures with different pinholes of varying sizes and/or shapes, the dynamic aperture 106 may be mounted on a linear stage 114. The processor 102 may cause the linear or rotation stage 114 or rotation stage to move in one or more directions to select, set or use one of the apertures with one of the pinholes for the laser beam to pass through. The processor 102 moves the linear or rotation stage 114 to a first position to select an aperture with a small-scale pinhole, a second position to select an aperture with a medium-scale pinhole, or a third position to select an aperture with a large-scale pinhole, for example.

Other components modify and/or direct the laser beam within the beam optics device 200. FIG. 2 shows the arrangement of the various components of the beam optics device 200 and the path of the laser beam through the beam optics device 200. The beam optics device 200 may include the light source 104, the one or more lenses 108, the dynamic aperture 106 and/or one or more mirrors 120.

The multi-scale SL apparatus 100 includes one or more lenses 108 that focus and/or narrow the laser beam. The one or more lenses 108 may include a collimating lens 108a and/or a focus lens 108b. The collimating lens 108a may narrow a laser beam that passes through. The collimating lens 108a may be positioned before the dynamic aperture 106 to narrow the laser beam prior to entering the dynamic aperture 106. The focus lens 108b may focus a laser beam that passes through. The focus lens 108b may be positioned after the dynamic aperture 106 and before a mirror 120 to focus the laser beam onto the mirror 120.

The multi-scale SL apparatus 100 may include one or more mirrors 120. The one or more mirrors 120 may direct the laser beam onto resin to be cured to form a part 122 or a feature onto the part 122. The one or more mirrors may include a galvo mirror that deflects and/or redirects the laser beam onto the resin to be cured. The one or more mirrors 120 may direct the laser beam onto resin to cure the resin to form the part 122 and/or form a feature on the part 122. The multi-scale SL apparatus 100 may include a resin tank 118 that stores and holds the resin and/or a platform 112 that holds the part 122. The platform 112 may have a motor and/or an actuator. The processor 102 may move the platform 112 using the motor and/or the actuator to move the platform 112 vertically to adjust the thickness of the fabricated layer.

The laser beam from the light source 104 may pass through and be narrowed by the collimating lens 108a. The dynamic aperture 106 receives the laser beam that passes through the collimating lens 108a. The dynamic aperture 106, which may be positioned or set by moving the linear or rotation stage 114, has any number of pinholes with different shapes and/or sizes that modify the laser beam and provide the laser beam to the focus lens 108b. Then, the focus lens 108b focuses the laser beam onto a galvo mirror, for example, to be redirected at the resin in the resin tank 118. The resin is cured to form the part or a feature of the part 122.

FIG. 4 shows a matrix of pinholes 402. The multi-scale SL apparatus 100 may set the dynamic aperture 106 to use the aperture with a matrix of pinholes 402 to modify the laser beam to form a pillar-shaped part 404, for example. The multi-scale SL apparatus 100 may use other shapes, such as a rectangular shape, a triangular shape or other polygon shape to form other types or other shaped parts. The differently shaped beams allow for simultaneous curing of a part to increase fabrication speed and provide for specific micro patterns to modify the surface texture of the part 122.

Figure 5:
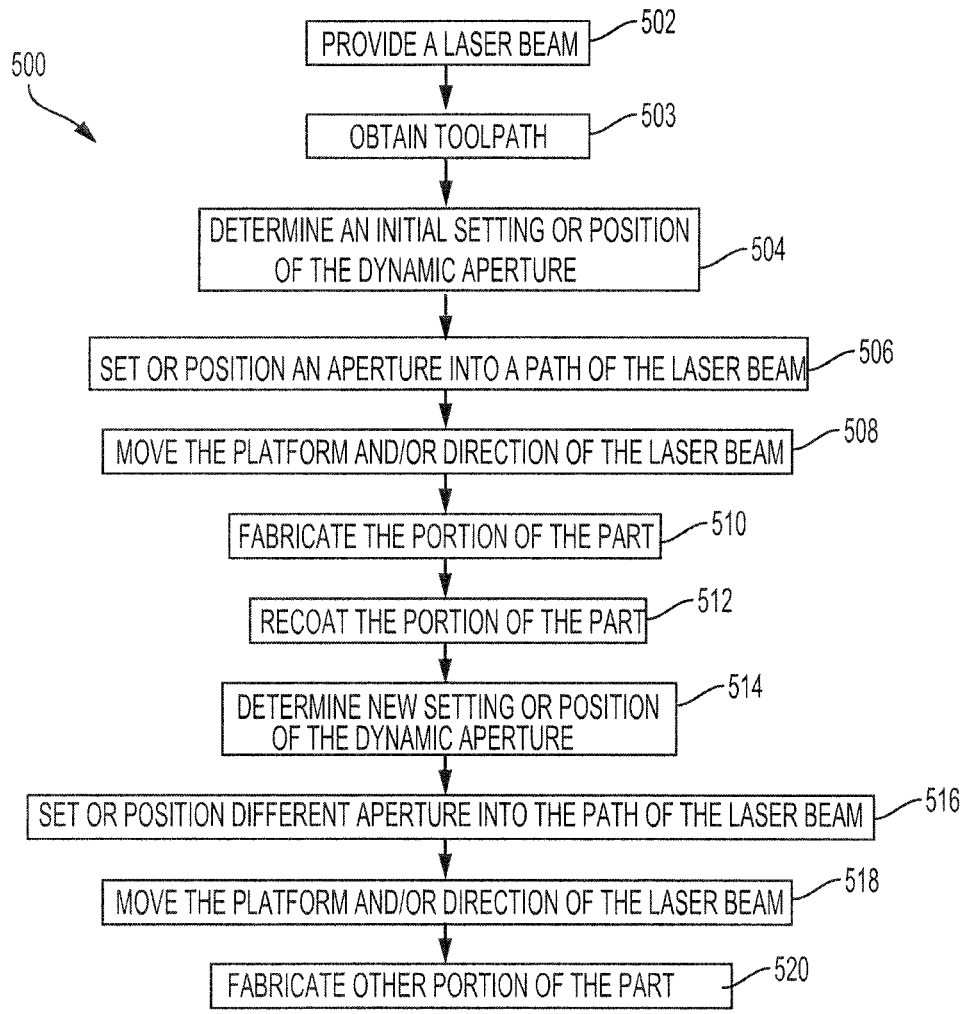
FIG. 5 is a flow diagram of an example process for fabricating different regions or portions of the part using the multi-scale SL apparatus of FIG. 1 according to an aspect of the invention.

FIG. 5 describes the process 500 to fabricate the part 122 and/or a feature on the part 122 using the multi-scale SL apparatus 100. One or more computers or one or more data processing apparatuses, for example, the processor 102 of the multi-scale SL apparatus 100 of FIG. 1, appropriately programmed, may implement the process 500.

The multi-scale SL apparatus 100 provides a laser beam using a light source 104 (502). The light source 104 may be a laser diode. The light source 104 may provide the laser beam that is subsequently modified and used to cure the resin to form the part 122 and/or a feature on the part 122. The light source 104 may provide the laser beam to one or more lenses 108, such as a collimating lens 108a, to narrow the laser beam prior to modifying the laser beam into a different shape and/or size to form a second laser beam.

The multi-scale SL apparatus 100 may obtain the toolpath from the memory 110 (503). The toolpath may include information as to the portion width to be fabricated along the XY planar direction, e.g., the boundary portion or interior portion, the one or more offsets, and the corresponding aperture to be used for the portions, e.g., the small-scale aperture, the medium-scale aperture or the large-scale aperture. The toolpath may include other information including the thickness of each layer within each portion, such as the boundary portion and/or the interior portion, and the corresponding aperture to be used for the layers within the portion.

The multi-scale SL apparatus 100 determines an initial position and/or an initial setting of the dynamic aperture 106 (504). The initial position and/or the initial setting may be based on the toolpath. The dynamic aperture 106 may have multiple apertures with different types and/or sizes of pinholes that are each associated with a different position and/or setting. The multi-scale SL apparatus 100 may determine the position and/or the setting based on a toolpath. FIG. 5 describes the process 500 for generating one or more toolpaths.

The multi-scale SL apparatus 100 may determine that the initial setting is a small-scale setting, a medium-scale setting and/or a large-scale setting, for example. The different settings and/or different positions are associated with different apertures with different sized pinholes. The small-scale setting may be associated with an aperture with a pinhole with a small-scale size. The medium-scale setting may be associated with an aperture with a pinhole with a medium-scale size. The large-scale setting may be associated with an aperture with a pinhole with a large-scale size. Other settings may be associated with other pinholes with different shapes and/or sizes.

The multi-scale SL apparatus 100 may associate each setting with a position for the dynamic aperture 106. The dynamic aperture 106 may be connected or mounted to a linear or rotation stage 114. The processor 102 may move the linear or rotation stage 114 to position different apertures with different sized and/or shaped pinholes into the path of the laser beam based on the setting. For example, a first position may place the small-scale pinhole into the path of the laser beam, a second position may place the medium-scale pinhole into the path of the laser beam and a third position may place the large-scale pinhole into the path of the laser beam.

The multi-scale SL apparatus 100 sets or positions one of the pinholes of the dynamic aperture 106 into the path of the laser beam to form another laser beam based on the initial setting or the initial position (506). The multi-scale SL apparatus 100 uses the pinhole to modify the laser beam to form a differently shaped and/or sized laser beam. The multi-scale SL apparatus 100 may set or position a small-scale pinhole into the path of the laser beam to form a small-scale laser beam. The multi-scale SL apparatus 100 may use the small-scale laser beam to form a boundary portion before switching to a different aperture to use a large-scale laser beam to form an interior portion. In some implementations, the multi-scale SL apparatus 100 uses the large-scale laser beam to form the interior portion before switching to a different aperture to use the small-scale laser beam to form the boundary portion.

In order to set or position the pinhole into the path of the laser beam, the multi-scale SL apparatus 100 may move or position a linear or rotation stage 114 from one position to another position to set the pinhole into the path of the laser beam. The position of the linear or rotation stage 114 places a corresponding aperture in the path of the laser beam. For example, the multi-scale SL apparatus 100 may move the linear or rotation stage 114 in one direction to transition from a medium-scale aperture to a small-scale aperture and/or move the linear or rotation stage 114 in the other direction to transition from the medium-scale aperture to a large-scale aperture.

The multi-scale SL apparatus 100 may use the small-scale aperture to position the small sized pinhole into the path of the laser beam, for example, to provide for high-resolution within the boundary portion, which has more detailed features than the interior portion. The multi-scale SL apparatus 100 may use the large-scale aperture to position the large sized pinhole into the path of the laser beam, for example, to provide for faster print speeds within the interior portion, which does not have detailed features. Thus, the multi-scale SL apparatus 100 optimizes both the resolution and the speed along the XY planar direction.

The multi-scale SL apparatus 100 moves the platform 112 or direction of the laser beams to fabricate a region of the part 122 based on the toolpath (508). The multi-scale SL apparatus 100 controls the direction of the laser beams using the one or more mirrors 120 to cure resin onto the part 122 along the XY planar direction. The multi-scale SL apparatus 100 uses the one or more offsets as boundaries.

The multi-scale SL apparatus 100 uses the thickness information of each layer to move the platform 112 to fabricate the region of the part 122 in the Z direction. Since the thickness of each layer within the boundary portion is less than the thickness of each layer within the interior portion, the multi-scale SL apparatus 100 may use a small-scale pinhole to fabricate each layer within the boundary portion, e.g., to provide high resolution, and a large-scale pinhole to fabricate each layer within the interior portion, e.g., to provide faster print speeds. The multi-scale SL apparatus 100 adjusts the platform 112 in the vertical direction by the thickness of each layer upon completion of fabrication of one of the layers.

The multi-scale SL apparatus 100 fabricates the part 122 (510). The multi-scale SL apparatus 100 may activate the light source 104 when the at least one of the light source 104 or the platform 112 are positioned to fabricate or print the part 122. The multi-scale SL apparatus may use one or more lenses 108 and/or one or more mirrors 120 to focus and direct the laser beam from the light source 104 at the resin to cure the resin onto the region of the part 122. The resin may be stored in the resin tank 118. When the multi-scale SL apparatus 100 finishes one layer of the part, the multi-scale SL apparatus 100 may adjust a height of the platform 112 by the thickness to fabricate the next layer of the part 122.

Figure 7:
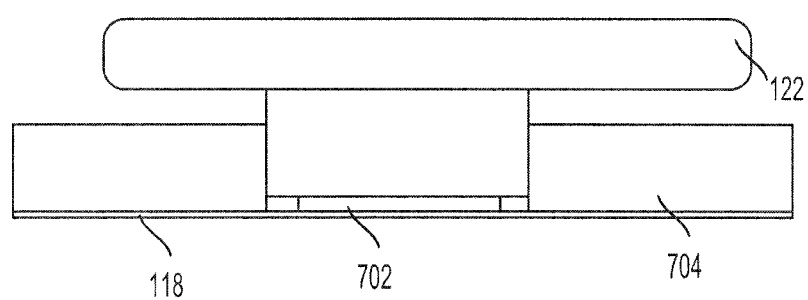
FIG. 7 shows resin recoating the part after a layer of the part has been fabricated according to an aspect of the invention.

After the multi-scale SL apparatus 100 uses the small-scale laser beam to fabricate the part 122, e.g., the boundary portion, the multi-scale SL apparatus 100 may recoat the fabricated portion of the part 122 with resin (512). For example, the multi-scale SL apparatus 100 may recoat the boundary portion that is fabricated using the small-scale laser beam with resin. In some implementations, since the multi-scale SL apparatus slices the boundary portion into multiple small layers, the multi-scale SL apparatus does not need to recoat the small layer with resin prior to moving the platform 112 upward to form another small layer within the boundary portion. Even if the multi-scale SL apparatus 100 recoats the small layer within the boundary portion, the amount of time to recoat the small layer within the boundary portion is less than the time to recoat a large layer. This is because the amount of resin necessary to displace the volume that is vacated when the platform 112 moves after finishing a small layer with a small-scale laser beam is less than the amount of resin necessary after finishing a large layer with a large-scale laser beam. Thus, the time necessary to recoat is less after finishing the small layer with the small-scale laser beam than after finishing the large layer with the large-scale laser beam. FIG. 7 shows the part 122 within the resin tank 118. When the part 122 is moved upward, a gap 702 is formed. The surrounding resin 704 fills-in the gap 702 to recoat the part 122 after being moved upward. Thus, the multi-scale SL apparatus 100 may not need to wait a period of time to recoat the part 122 after being moved upward because the volume of the gap 702 is naturally filled by the resin 704 within a small amount of time.

After the multi-scale SL apparatus 100 recoats the portion of the part 122, the multi-scale SL apparatus may repeat the process for another portion, such as the interior portion, to fabricate the other portion of the part 122. The multi-scale apparatus may determine a new setting or position of the dynamic aperture 106 to set or position a different aperture, such as an aperture with a large-scale pinhole, into the path of the laser beam based on a toolpath (514).

Different sizes, shapes and/or thicknesses have different advantages. The multi-scale SL apparatus 100 uses these different pinholes to take advantage of the different advantages for different portions of the part 122. For example, a small-scale laser beam and a small layer thickness may cure features with a high resolution, while a large-scale laser beam may quickly cure a large portion of resin and a large layer thickness. The multi-scale SL apparatus 100 may automatically select the appropriate aperture with the appropriate pinhole that corresponds with a laser beam that optimizes these different advantages based on the tool path.

Once the multi-scale SL apparatus 100 determines the new setting or position, the multi-scale SL apparatus 100 sets or positions the associated aperture with the appropriate pinhole into the path of the laser beam based on the new setting or position to modify the laser beam into another shape and/or size (516). That is, the multi-scale SL apparatus 100 may move the linear or rotation stage 114 from the initial position to a new position that sets or positions the different aperture with the different pinhole that optimizes a corresponding feature, such as fabrication speed, into the path of the laser beam. After the multi-scale SL apparatus 100 sets or positions the associated pinhole, the multi-scale SL apparatus 100 moves the platform 112 or directs the laser beam to fabricate another portion of the part 122 (518) and fabricates the other portion of the part 122 (520).

Figure 6:
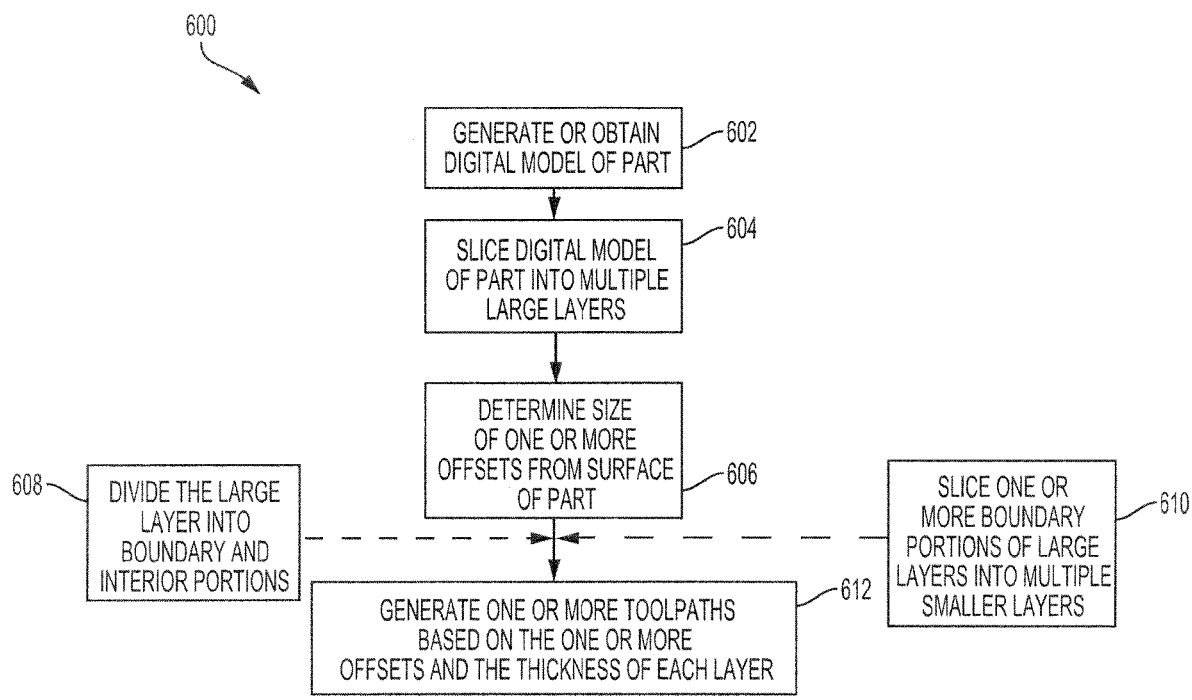
FIG. 6 is a flow diagram of an example process for generating one or more toolpaths used by the multi-scale SL apparatus of FIG. 1 to fabricate the different regions or portions of the part according to an aspect of the invention.

FIG. 6 describes the process 600 to generate one or more toolpaths used to fabricate the part or feature of the part using the multi-scale SL apparatus 100. One or more computers or one or more data processing apparatuses, for example, the processor 102 of the multi-scale SL apparatus 100 of FIG. 1, appropriately programmed, may implement the process 600.

The multi-scale SL apparatus 100 obtains or generates a digital model of the part 122 (602). The digital model may be a computer-aided design (CAD) drawing or other digital model. The digital model is a technical drawing used by computer software to design curves, figures, solids or other objects, such as the part, in three-dimensional (3D) space. The multi-scale SL apparatus 100 may receive or obtain the digital model via user input from the user interface 116 or may be obtained from the memory 110.

The multi-scale SL apparatus 100 slices the digital model of the part 122 into multiple large layers (604). The large layer may have a large thickness, which may be greater in thickness than a small thickness of a small layer, respectively. The large layer may have a thickness of approximately 100 µm, for example.

The multi-scale SL apparatus 100 determines a size of one or more offsets (606). The one or more offsets may be based on the size and/or the shape of the one or more pinholes of the different apertures, i.e., the aperture size, of the dynamic aperture 106 and/or the contours of the part 122 that is to be printed. The different shapes and/or sizes may be pre-configured and/or may be user inputted into the multi-scale SL apparatus 100. In some implementations, the multi-scale SL apparatus 100 may detect the different shapes and/or sizes of the one or more pinholes. The size of an offset may be a function of the radius of the corresponding aperture of the dynamic aperture 106 and a thickness of the layer of the portion of the feature within the offset region.

The multi-scale SL apparatus 100 determines the size of the pinhole for each of the one or more apertures of the dynamic aperture 106. The size of the pinhole for each of the one or more apertures may be pre-configured or user-inputted. The multi-scale SL apparatus 100 calculates an offset for each aperture. The multi-scale SL apparatus 100 may order the different apertures with differently sized pinholes from smallest to largest to determine the one or more offsets from the contour of the part 122.

For example, the multi-scale SL apparatus 100 identifies the aperture with the smallest pinhole, i.e., the smallest aperture size, and sets a smallest offset a distance from the contour of the part 122. The first distance may be approximately the size of the smallest aperture size. This forms a boundary portion between the contour of the part 122 and the smallest offset. The multi-scale SL apparatus 100 reserves this boundary portion to use a small-scale aperture that has a small-scale pinhole to form a small-scale laser beam to ensure that small or highly detailed features of the boundary portion are fabricated with a high resolution.

After determining the smallest offset, the multi-scale SL apparatus 100 determines the next offset based on the ordering of the apertures. The next offset is offset relative to the offset for the previous aperture, e.g., the previous aperture with the previous smaller sized pinhole and based on the size of the next aperture in the ordering. The multi-scale SL apparatus 100 repeats this process of determining the offset until the last remaining aperture, which may be the aperture with the largest sized pinhole and which may be used to form the interior portion. The last aperture, such as the aperture with the largest sized pinhole, may be used to form the remaining portion, i.e., the interior portion of the part 122, after all the other offsets, for example.

For example, if there are 3 apertures and the smallest aperture size is approximately 50 µm, the first offset is approximately 50 µm from the contour of the part 122. If next smallest apertures size, e.g., the medium aperture size, is approximately 100 µm, the second offset is approximately 100 µm from the first offset and approximately 150 µm from the contour of the part 122. Lastly, the multi-scale SL apparatus 100 uses the largest aperture size, which may be approximately 200 µm to 300 µm, for the remaining portion that is farthest inward from the contour of the part 122, i.e., the interior portion.

The multi-scale SL apparatus 100 may divide one or more of the multiple large layers into a boundary portion and an interior portion based on the one or more offsets (608). The multi-scale SL apparatus 100 may determine that a portion between the contour of the part 122 and the one or more offsets is the boundary portion and determine that the remaining portion that is inward of the one or more offsets is the interior portion. By using the largest aperture size to fabricate the interior portion and the other aperture sizes to fabricate the boundary portion, the multi-scale SL apparatus 100 optimizes resolution and/or speed along the XY plane.

The multi-scale SL apparatus 100 may slice the boundary portion of each of the multiple large layers into multiple smaller layers (610). The multiple smaller layers may be of any number of layers with differing thicknesses. The multiple smaller layers may have a small thickness, which may be smaller in thickness than the large thickness of the large layer. A smaller layer may have a thickness of approximately 20 µm, for example. In some implementations, the multi-scale SL apparatus 100 may slice the boundary portion of each of the multiple large layers into multiple medium layers with a medium thickness and slice each of the multiple medium layers into the multiple smaller layers. The medium thickness may be greater than the small thickness but less than the large thickness. The multi-scale SL apparatus 100 may use any number of slices to optimize the resolution and/or the speed of the fabrication.

Figure 9:
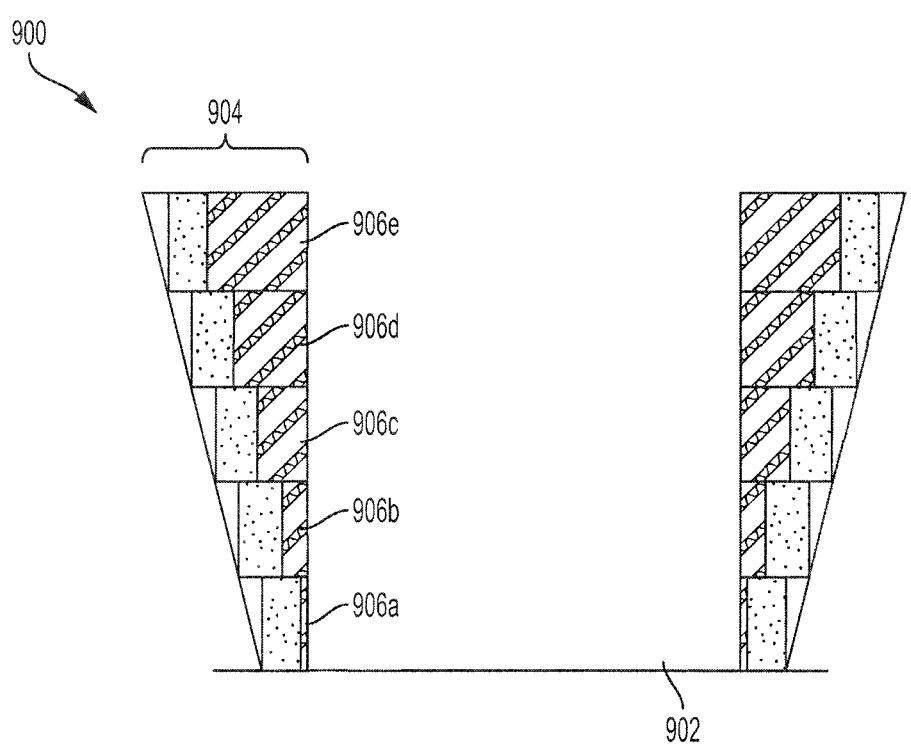
FIG. 9 shows a large layer of a part and the corresponding interior portion and boundary portion according to an aspect of the invention.

When the multi-scale SL apparatus 100 slices the boundary portion of each of the multiple larger layers into multiple smaller layers, the multi-scale SL apparatus 100 provides for higher resolution along the boundary portion, since the layers within the boundary portion are of a smaller thickness. Whereas, when the multi-scale SL apparatus 100 slices the interior portion into multiple large layers, the multi-scale SL apparatus 100 provides for faster fabrication speed(s). Since only the boundary portion utilizes the smaller layers, this saves a significant amount of printing time since the inner portion is filled using the large-scale laser beam and larger layers. FIG. 9 shows a large layer 900 of the multiple large layers of a part 122 and the corresponding interior portion 902 and boundary portion 904 of the large layer 900. The boundary portion 904 is divided into multiple small layers 906a-e.

Instead of dividing the large layer into the boundary portion and interior portion and slicing the boundary portion into multiple small layers, in some implementations, the multi-scale SL apparatus 100 may slice each of the multiple large layers that form the part 122 into multiple small layers, and then, divide each of the multiple small layers into a boundary portion and an interior portion based on the one or more offsets. Similarly, this provides for a higher resolution along the boundary portion, since the layers within the boundary portion are of a smaller thickness. And, since the multi-scale SL apparatus 100 may use a large-scale laser beam to fabricate the interior portion, which is a common region among the multiple smaller layers, this provides for a faster fabrication speed.

The multi-scale SL apparatus 100 generates one or more toolpaths based on the sliced digital model including the one or more offsets and the thickness of each layer of the digital model (612). The multi-scale SL apparatus 100 may generate a toolpath for each aperture of the dynamic aperture 106 that is used to form layers within portions among the one or more offsets.

For example, the multi-scale SL apparatus 100 may generate a toolpath for the small-scale aperture that is used to fabricate the boundary portion within the smallest offset, which is closest to the contours of the part 122, and has a small layer thickness. The multi-scale SL apparatus 100 may generate a toolpath for each of the other apertures that are used to fabricate the boundary portion within the other offsets. And, the multi-scale SL apparatus 100 may generate a last toolpath for the large-scale aperture that is used to fabricate the interior portion, which is the most inward and farthest from the contours of the part, and has a large layer thickness.

The multi-scale SL apparatus 100 may generate a toolpath for each layer of each offset within the boundary portion and for the interior portion of the part 122. The multi-scale SL apparatus 100 may associate the corresponding aperture of a particular size with a layer of a particular thickness within an offset from the contours of the part 122. The multi-scale SL apparatus 100 may associate any number of aperture sizes with any number of thicknesses. For example, a small-scale aperture size may be associated with a small-scale offset and a small layer thickness, a medium-scale aperture size may be associated with a medium-scale offset and a small layer thickness, and a large-scale aperture size may be associated with a large-scale offset and a large layer thickness. In another example, a small-scale aperture size may be associated with a small-scale offset and a small layer thickness, a medium-scale aperture size may be associated with a medium-scale offset and a medium layer thickness, and a large-scale aperture size may be associated with a large-scale offset and a large layer thickness. In some implementations, two or more toolpaths may overlap or have an overlapping portion to ensure that the toolpaths are blended together and/or a buffer region to prevent any empty regions between the toolpaths.

FIG. 8 shows a table that compares different stereolithography apparatuses and/or processes across different metrics. The various apparatuses and/or processes included laser-based SLA (LSL), projection-based micro SLA (PuSL), two photon polymerization (TPP), continuous interface liquid production (CLIP) and large area projection-based micro SLA (LaPuSL). The comparison is done across five major fabrication metrics including part size, feature resolution, part-size-to-feature-size ratio, fabrication speed and cost. As shown in FIG. 8, the conventional SL processes face trade-offs among fabrication speed, resolution, scalability and cost. However, the multi-scale SL apparatus 100 optimizes the resolution, speed and cost. The multi-scale SL apparatus 100 uses the multi-scale laser beams in the XY plane and multi-scale layer thickness in the Z direction to optimize the resolution, speed and cost.

Exemplary embodiments, of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method of providing differing light beams in a multi-scale stereolithography apparatus, the method comprising:
    providing, using a light source, an original light beam for curing a resin on a resin tank to create a portion of a fabricated part, including narrowing the original light beam through one or more lenses prior to modifying the original light beam;
    subsequent to narrowing the original light beam, adjusting, using a processor, a dynamic aperture to a first aperture;
    projecting, using the light source, the original light beam through the first aperture to form a second light beam with a first beam dimension and onto the resin;
    adjusting, using the processor, the dynamic aperture to a second aperture; and
    projecting, using the light source, the original light beam through the second aperture to form a third light beam with a second beam dimension and onto the resin;
    wherein the first beam dimension is smaller than the second beam dimension, and
    wherein adjusting the dynamic aperture comprises moving a linear or rotary stage supporting the dynamic aperture based on a toolpath adapted to optimize resolution or speed along an XY plane of a layer of the fabricated part.

2. The method of claim 1, further comprising:
    determining, using the processor, a first offset for the first beam dimension;
    determining, using the processor, a second offset for the second beam dimension;
    generating a first toolpath for the second light beam based on the first offset for the first beam dimension to form a boundary portion;

generating a second toolpath for the third light beam based on the second offset for the second beam dimension to form an interior portion; and generating a third toolpath for the second light beam to fill gaps in the interior portion of a part and form the boundary portion.

3. The method of claim 2, further comprising:

forming a boundary portion of an object using the second light beam based on the generated first toolpath for the second light beam;

forming the interior portion of the object using the third light beam based on the generated second toolpath for the third light beam; and filling gaps of the interior portion using the second light beam based on the generated third toolpath for the second light beam.

4. The method of claim 2, further comprising:

determining, using the processor, a first thickness associated with use of the first aperture; and determining, using the processor, a second thickness associated with use of the second aperture;

wherein generating the first toolpath for the second light beam is further based on the first thickness and generating the second toolpath for the third light beam is further based on the second thickness, wherein the first toolpath and the third toolpath for the second light beam forms the boundary portion of a part and the second toolpath for the third light beam forms the interior portion of the part.

5. The method of claim 1, wherein adjusting the dynamic aperture to the first aperture includes moving, using the processor, a linear stage to a first position that positions the first aperture into a path of the original light beam, wherein adjusting the dynamic aperture to the second aperture includes moving, using the processor, the linear stage to a second position that positions the second aperture into the path of the original light beam.

6. The method of claim 1, wherein the first beam dimension has at least one of a different size or shape than the second beam dimension.

7. The method of claim 1, further comprising:

adjusting, using the processor, the dynamic aperture to a third aperture; and projecting, using the light source, the original light beam through the third aperture to form a fourth light beam with a third beam dimension and onto the resin, wherein the third beam dimension is greater in size than the first beam dimension and the second beam dimension.

8. The method of claim 1, wherein narrowing the original light beam through one or more lenses comprises passing the original light beam through a collimating lens.

9. The method of claim 1, wherein projecting the second light beam or third light beam onto the resin comprises focusing the second light beam or the third light beam onto a mirror directed onto the resin.

10. The method of claim 9, further comprising:

controlling the direction of the second light beam or the third light beam using the mirror to cure resin onto a portion of the fabricated part along the XY planar direction.

11. The method of claim 10, further comprising:

using thickness information of each layer of cured resin to move a platform to fabricate the part in a Z direction.

12. The method of claim 1, further comprising obtaining the toolpath from a memory of the multi-scale stereolithography apparatus.

13. The method of claim 1, further comprising determining an initial position or initial setting of the dynamic aperture.

14. A method of providing differing light beams in a multi-scale stereolithography apparatus, the method comprising:

providing, using a light source, an original light beam for curing a resin on a resin tank to create a portion of a fabricated part, including narrowing the original light beam through one or more lenses prior to modifying the original light beam;

subsequent to narrowing the original light beam, adjusting, using a processor, a dynamic aperture to a first aperture;

projecting, using the light source, the original light beam through the first aperture to form a second light beam with a first beam dimension and onto the resin;

adjusting, using the processor, the dynamic aperture to a second aperture by moving a linear or rotary stage supporting the dynamic aperture based on a toolpath adapted to optimize resolution or speed along an XY plane of a layer of the fabricated part;

projecting, using the light source, the original light beam through the second aperture to form a third light beam with a second beam dimension and onto the resin, wherein the first beam dimension is smaller than the second beam dimension and wherein projecting the second light beam or third light beam onto the resin comprises focusing the second light beam or the third light beam onto a mirror directed onto the resin; and controlling a direction of the second light beam or the third light beam by using the mirror to cure resin onto a portion of the fabricated part along the XY planar direction.

15. The method of claim 14, further comprising:

determining, using the processor, a first offset for the first beam dimension;

determining, using the processor, a second offset for the second beam dimension;

generating a first toolpath for the second light beam based on the first offset for the first beam dimension to form a boundary portion;

generating a second toolpath for the third light beam based on the second offset for the second beam dimension to form an interior portion; and generating a third toolpath for the second light beam to fill gaps in the interior portion of a part and form the boundary portion.

16. The method of claim 15, further comprising:

forming a boundary portion of an object using the second light beam based on the generated first toolpath for the second light beam;

forming the interior portion of the object using the third light beam based on the generated second toolpath for the third light beam; and filling gaps of the interior portion using the second light beam based on the generated third toolpath for the second light beam.

17. The method of claim 15, further comprising:

determining, using the processor, a first thickness associated with use of the first aperture; and determining, using the processor, a second thickness associated with use of the second aperture;

wherein generating the first toolpath for the second light beam is further based on the first thickness and generating the second toolpath for the third light beam is further based on the second thickness, wherein the first toolpath and the third toolpath for the second light beam forms the boundary portion of a part and the second toolpath for the third light beam forms the interior portion of the part.

18. The method of claim 14, wherein adjusting the dynamic aperture to the first aperture includes moving, using the processor, a linear stage to a first position that positions the first aperture into a path of the original light beam, wherein adjusting the dynamic aperture to the second aperture includes moving, using the processor, the linear stage to a second position that positions the second aperture into the path of the original light beam.

19. The method of claim 14, wherein the first beam dimension has at least one of a different size or shape than the second beam dimension.

20. The method of claim 14, further comprising:
- adjusting, using the processor, the dynamic aperture to a third aperture; and
- projecting, using the light source, the original light beam through the third aperture to form a fourth light beam with a third beam dimension and onto the resin, wherein the third beam dimension is greater in size than the first beam dimension and the second beam dimension.

* * * * *